United States Patent [19]

Beffa

[11] Patent Number: 4,563,193

[45] Date of Patent: Jan. 7, 1986

[54] ASYMMETRIC 1:2 CHROME COMPLEX DYES CONTAINING AN AZO AND AN AZOMETHINE COMPOUND

[75] Inventor: Fabio Beffa, Riehen, Switzerland

[73] Assignee: Ciba Geigy Corporation, Ardsley, N.Y.

[21] Appl. No.: 549,037

[22] Filed: Nov. 7, 1983

[30] Foreign Application Priority Data

Nov. 16, 1982 [CH] Switzerland .......................... 6667/82

[51] Int. Cl.[4] ............................................... C09B 45/26

[52] U.S. Cl. ............................................. 8/685; 8/438; 8/686; 8/917; 8/924; 8/926; 534/602; 534/695; 534/710; 534/713; 534/738; 534/753

[58] Field of Search ......................... 260/145 A, 145 B; 8/685, 686; 534/695, 602, 710

[56] References Cited

U.S. PATENT DOCUMENTS

| | | | |
|---|---|---|---|
| 2,985,646 | 5/1961 | Schetty et al. | 260/145 A |
| 4,443,370 | 4/1984 | Puntener | 8/686 |

FOREIGN PATENT DOCUMENTS

| | | |
|---|---|---|
| 43794 | 1/1982 | European Pat. Off. . |
| 66230 | 12/1982 | European Pat. Off. . |
| 1387976 | 3/1975 | United Kingdom . |

*Primary Examiner*—A. Lionel Clingman
*Attorney, Agent, or Firm*—Edward McC. Roberts; Kevin T. Mansfield; Irving M. Fishman

[57] ABSTRACT

The novel asymmetric 1:2 chrome complex dyes of the formula I given in claim 1 are suitable in particular for dyeing wool or polyamide and especially leather.

9 Claims, No Drawings

ASYMMETRIC 1:2 CHROME COMPLEX DYES CONTAINING AN AZO AND AN AZOMETHINE COMPOUND

The present invention relates to 1:2 chrome complex dyes of the formula I

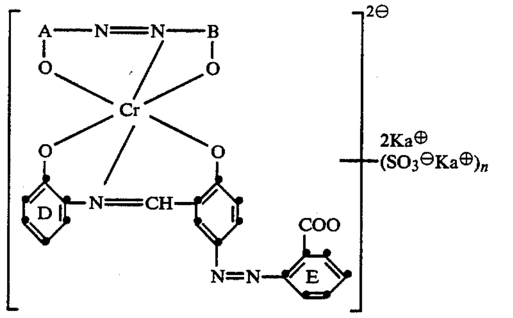

(I)

wherein

A is the radical of a diazo component of the benzene or naphthalene series, which carries the hydroxyl group in the o-position with respect to the azo group, B is the radical of a coupling component which carries the hydroxyl group in the position adjacent to the azo group, n is 1 or 2, and $Ka^{\oplus}$ is a cation, and wherein the rings D and E can carry further substituents, the ring E however cannot carry a nitro group, with the proviso that A cannot be the radical of 1-amino-2-hydroxynaphthalene-4-sulfonic acid when B is the radical of 2-naphthol, the ring D is substituted only by nitro in the p-position with respect to the oxygen atom and E is not further substituted.

In the chrome complex dyes of the above formula I, the diazo component can carry one or more further substituents, for example low-molecular alkyl or alkoxy, halogen, such as chlorine or bromine, nitro, cyano, sulfo, alkylsulfonyl, for example methylsulfonyl, sulfamides, for example sulfamide or N-methylsulfamide, or acylamino. By low-molecular alkyl or alkoxy groups in this application are in general meant those having 1 to 6, preferably 1 to 2, C atoms; and by "acylamino" are denoted low-molecular alkanoylamino, alkylsulfonylamino and alkoxycarbonylamino groups, and also aroylamino and arylsulfonylamino groups.

The radical A is derived for example from the following amines: 2-amino-1-hydroxybenzene, 4-chloro- and 4,6-dichloro-2-amino-1-hydroxybenzene, 4- or 5-nitro-2-amino-1-hydroxybenzene, 4-chloro-, 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-sulfonamido-2-amino-1-hydroxybenzene, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid, 2-amino-1-hydroxybenzene-4,6-disulfonic acid or 4-methylsulfonyl-2-amino-1-hydroxybenzene.

Applicable for A in place of the aforementioned amines having a hydroxyl group are also corresponding methoxy compounds or corresponding compounds of which the hydroxyl group has been tosylated, such as anisidine, 4- or 5-chloroanisidine, 4- or 5-nitroanisidine, anisidine-4- or -5-sulfonic acid, or tosylated 1-hydroxy-2-aminobenzene, the methoxy or O-tosyl group being converted, before or during metallisation, into an OH group. Compounds having these groups are used in particular when the corresponding 1-hydroxy-2-amino compounds do not couple well.

In the preferred dyes, A is the radical of a 1-hydroxy-2-aminobenzene, which is unsubstituted or substituted by halogen, nitro, sulfo or low-molecular alkyl or alkoxy, or is the radical of a 1-amino-2-hydroxy-4-sulfonaphthalene, which is unsubstituted or substituted in the 6-position by halogen, such as bromine or especially chlorine, or by nitro or sulfo.

The radical B is derived preferably from the following groups of coupling components: phenols which couple in the o-position and which are unsubstituted or substituted by low-molecular alkyl or alkoxy, dialkylamino or acylamino, where acylamino is $C_1$–$C_4$-alkanoyl, $C_1$–$C_4$-alkylsulfonylamino, $C_1$–$C_4$-alkoxycarbonylamino, aroylamino or arylsulfonylamino groups; naphthols, which are unsubstituted or substituted by $C_1$–$C_4$-alkyl or -alkoxy, chlorine, amino, acylamino or sulfo, acylamino being as defined above; 5-pyrazolones which have in the 1-position a phenyl or naphthyl group which is unsubstituted or substituted by chlorine, nitro, $C_1$–$C_4$-alkyl or -alkoxy groups or sulfo groups, and have in the 3-position a $C_1$–$C_4$-alkyl or carboxy group, especially a methyl group; acetoacetic acid amides, particularly acetoacetic acid anilides, and benzoylacetic acid anilides, which can be unsubstituted or substituted in the anilide nucleus by chlorine, bromine, nitro, $C_1$–$C_4$-alkyl or -alkoxy or sulfo groups; 6-hydroxy-3-cyano- or 6-hydroxy-3-carbonamido-4-alkyl-2-pyridones, which are substituted in the 1-position by unsubstituted or substituted $C_1$–$C_4$-alkyl, for example methyl, isopropyl, β-hydroxyethyl, β-aminoethyl or γ-isopropoxypropyl, or by phenyl, and which can carry in the 4-position a $C_1$–$C_4$-alkyl group, particularly methyl, or hydroxyquinolines.

Examples of such coupling components are: 2-naphthol, 1-naphthol, 1-acetylamino-7-naphthol, 1-propionylamino-7-naphthol, 1-carbomethoxyamino-7-naphthol, 1-carboethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 4-methyl-1-naphthol, 4-methoxy-1-naphthol, 4-acetyl-1-naphthol, 5,8-dichloro-1-naphthol, 5-chloro-1-naphthol, 1-phenyl-3-methylpyrazol-5-one, 1-phenyl-5-pyrazolone-3-carboxylic acid amide, 1-(2'-, 3'- or 4'-methylphenyl)-3-methylpyrazol-5-one, 1-(2',3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2',5'- or 3',4'-dichlorophenyl)-3-methylpyrazol-5-one, 1-(2',5'-dichloro-4'-sulfophenyl)-3-methylpyrazol-5-one, acetoacetanilide, acetoacetanilide-4-sulfonic acid, acetoacet-o-anisidide, acetoacet-o-toluidide, acetoacet-o-chloroanilide, acetoacet-m-xylidide, tetralol, 4-methylphenol, 3-dialkylaminophenols, especially 3-dimethylamino- or 3-diethylaminophenol, 4-butylphenol, preferably 4-tert-butylphenol, 4-amylphenol, particularly 4-t-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, 1-methyl-3-cyano-4-ethyl-6-hydroxypyridone, 1-methyl-3-cyano-4-methyl-6-hydroxypyridine, 1-phenyl-3-carbonamido-4-methyl-6-hydroxypyridone and 1-ethyl-4-hydroxy-2-quinolone.

The coupling component B is preferably a 1- or 2-naphthol which is unsubstituted or substituted by amino and/or sulfo; or p-alkyl($C_1$–$C_6$)-phenol, 1-phenyl-3-methyl-5-pyrazolone or acetoacetic acid anilide, and the phenyl group in the two last-mentioned compounds can be substituted by $C_1$–$C_4$-alkyl, $C_1$–$C_4$-alkoxy, chlorine or sulfo.

In the azomethine dye of the 1:2 chrome complexes of the formula I given above, the rings D and E can carry further substituents.

The ring D is preferably unsubstituted or mono- or disubstituted by sulfo, nitro, halogen, $C_1$–$C_4$-alkyl, $C_1$–$C_4$-alkoxy, $C_1$–$C_4$-alkylsulfonyl or sulfonamide.

The radical D is derived for example from the following amines: 2-amino-1-hydroxybenzene, 4-chloro- and 4,6-dichloro-2-amino-1-hydroxybenzene, 4- or 5-nitro-2-amino-1-hydroxybenzene, 4-chloro- and 4-methyl-6-nitro-2-amino-1-hydroxybenzene, 6-acetylamino- and 6-chloro-4-nitro-2-amino-1-hydroxybenzene, 4-sulfonamido-2-amino-1-hydroxybenzene, 4-methylsulfonyl-2-amino-1-hydroxybenzene, 4-methoxy-2-amino-1-hydroxybenzene, 4-methoxy-5-chloro-2-amino-1-hydroxybenzene, 4-methyl-2-amino-1-hydroxybenzene, 4-chloro- and 4-methyl-5-nitro-2-amino-1-hydroxybenzene, 3,4,6-trichloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 6-nitro-2-amino-1-hydroxybenzene-4-sulfonic acid, 6-chloro-2-amino-1-hydroxybenzene-4-sulfonic acid, 4-chloro-2-amino-1-hydroxybenzene-6-sulfonic acid, 4-methylsulfonyl-5-nitro-2-amino-1-hydroxybenzene, 4-methylsulfonyl-6-nitro-2-amino-1-hydroxybenzene or 6-methyl-2-amino-1-hydroxybenzene-4-sulfonic acid.

In preferred dyes, the ring D is a 1-hydroxy-2-aminobenzene, which is unsubstituted or substituted by sulfo, nitro, halogen, methyl or methoxy.

The arylazo group E carries a carboxyl group in the o-position with respect to the azo group, and can in addition be substituted for example by chlorine, sulfo or methyl or by a further carboxyl group, not however by nitro. It is preferably the radical of 2-aminobenzoic acid.

Ka⊕ is a cation, for example an alkali metal cation, such as lithium, potassium or preferably sodium. Ka⊕ can also be an ammonium cation or the ammonium salt of an organic amine.

Particularly preferred by virtue of their good dyeing properties are the dyes of the formula II (II)

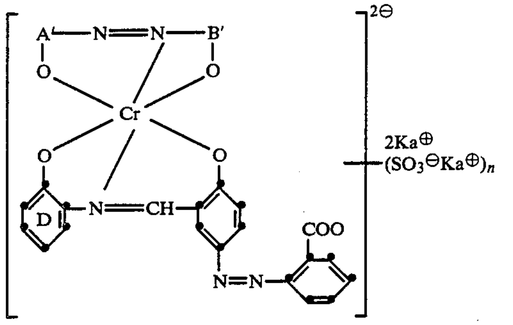

wherein

A' is the radical of a 1-hydroxy-2-aminobenzene, which is unsubstituted or substituted by halogen, nitro, sulfo or low-molecular alkyl or alkoxy, or is the radical of a 1-amino-2-hydroxy-4-sulfonaphthalene, which is unsubstituted or substituted in the 6-position by chlorine, nitro or sulfo, B' is a 1- or 2-naphthol which is unsubstituted or substituted by amino and/or sulfo, or is p-alkyl-($C_1$–$C_6$)-phenol, 1-phenyl-3-methyl-5-pyrazolone or acetoacetic acid anilide, and the phenyl group in the two last-mentioned compounds can be substituted by $C_1$–$C_4$-alkyl, $C_1$–$C_4$-alkoxy, chlorine or sulfo, n is 1 or 2, and wherein the ring D is unsubstituted or substituted by sulfo, nitro, halogen or methyl, and Ka⊕ is a cation, with the proviso that A' cannot be the radical of 1-amino-2-hydroxynaphthalene-4-sulfonic acid when B' is the radical of 2-naphthol and the ring D is substituted only by nitro in the p-position with respect to the oxygen atom.

Particularly suitable amongst these are the 1:2 chrome complexes which contain in all two nitro groups.

The dyes according to the invention can be obtained by methods known per se, for example by producing the 1:1 chrome complex of the azo dye, and then reacting this with the arylazo-azomethine dye or preferably with a mixture of the corresponding amine and aldehyde.

The 1:1 chrome complex is produced by methods known per se, for example in an acid solution with chromium-III salts. The 1:1 chrome complex is subsequently reacted in a slightly acid, neutral or slightly alkaline medium to the 1:2 chrome complex.

The novel metal-complex dyes of the formula I which are obtainable by the above process are isolated in the form of their salts, particularly alkali metal salts, especially sodium or lithium salts, or ammonium salts, or salts of organic amines having a positively charged nitrogen atom, and are suitable for dyeing and printing various materials, optionally in the presence of a levelling agent, above all however for dyeing and printing nitrogen-containing materials, such as silk or wool, and also synthetic fibres made from polyamides or polyurethanes, and especially leather.

Orange or brown to olive dyeings having good fastness properties, particularly good fastness to light and to wet processing, are obtained.

The preferred use of the dyes according to the invention is for the dyeing of wool and polyamide, and especially furs or leather, all types of leather being suitable, for example chrome leather, re-tanned leather or suède leather, of the goat, cow or pig.

The invention is further illustrated by the following Examples without its scope being limited by them. Parts are parts by weight, and percentages are percent by weight.

EXAMPLE 1

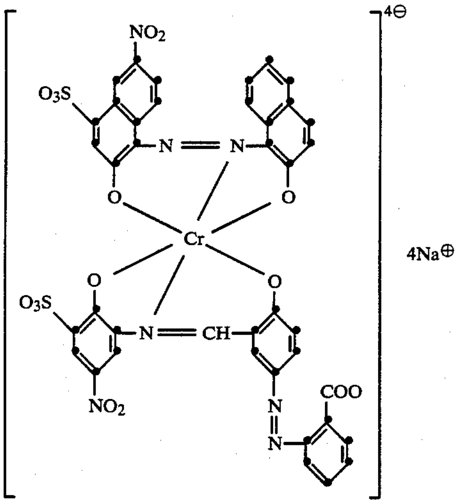

The 1:1 chrome complex, which contains 43.9 parts of the dye formed from diazotised 6-nitro-1-amino-2-hydroxynaphthalene-4-sulfonic acid and 2-hydroxynaphthalene as well as 5.2 parts of chromium, is introduced into 400 parts of water, and there are then added 23.4 parts of 4-nitro-2-amino-1-hydroxybenzene-6-sulfonic acid and 27 parts of the monoazo dye produced from diazotised 2-aminobenzoic acid and salicylaldehyde. The reaction mixture is heated to 90°–95° C., adjusted with sodium hydroxide to have a pH value of 6–6.5, and then held at this temperature until the starting products are no longer detectable. After the reaction has been completed, the dye is isolated by concentration by evaporation. There is thus obtained a dark powder which dissolves in water to give a brown colour, and which dyes leather in dark-brown shades having good fastness properties.

EXAMPLE 2

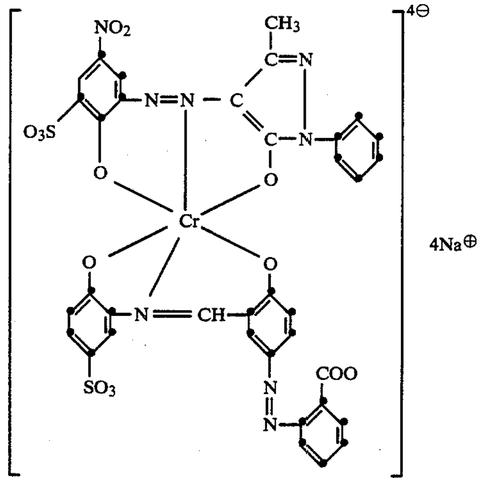

In 500 parts of water are suspended 46.9 parts of the complex chromium compound of the type 1 atom of chromium: 1 molecule of dye (which contains 5.2 parts of chromium and 41.9 parts of the monoazo dye formed from diazotised 4-nitro-2-amino-1-hydroxybenzene-6-sulfonic acid and 1-phenyl-3-methyl-5-pyrazolone) with 18.9 parts of 2-amino-1-hydroxybenzene-4-sulfonic acid and 27 parts of the monoazo dye formed from diazotised 2-aminobenzoic acid and salicylaldehyde. The reaction mixture is heated to 90°–95° C.; the pH value is adjusted to 7–7.5 with sodium hydroxide, and the mixture is held at this temperature and at a constant pH value until the starting products are no longer detectable. After completion of the reaction, the water is removed by evaporation to dryness or by spray drying. The product obtained is in the form of a dark powder which dissolves in water to give an orange colour, and which dyes leather in an orange shade having fastness to light.

EXAMPLE 3

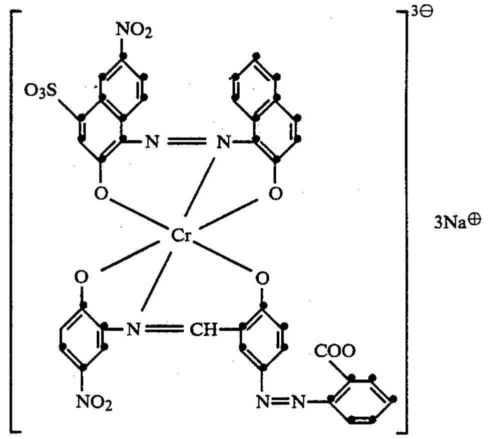

The 1:1 chrome complex containing 41.9 parts of the dye formed from diazotised 6-nitro-2-hydroxy-1-aminonaphthalene-4-sulfonic acid and 2-hydroxynaphthalene, as well as 5.2 parts of chromium is introduced into 400 parts of water; there are subsequently added 15.4 parts of 4-nitro-2-amino-1-hydroxybenzene and 27 parts of the monoazo dye formed from diazotised 2-aminobenzoic acid and salicylaldehyde, and the reaction mixture is stirred at 85°–90° C. and at a pH value of 7–7.5 until the starting products are no longer detectable. The water is then removed by evaporation to leave a dark powder which dissolves in water to give a brown colour, and which dyes leather in reddish-brown shades having good fastness properties.

EXAMPLE 4

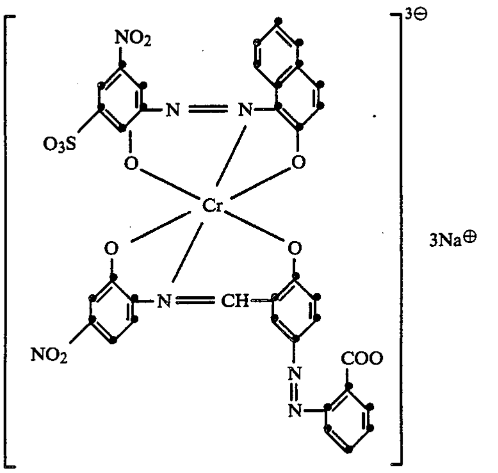

In 500 parts of water are suspended 43.9 parts of the complex chromium compound of the type 1 atom of chromium: 1 molecule of dye (which contains 5.2 parts of chromium and 38.9 parts of the monoazo dye formed from diazotised 4-nitro-2-amino-1-hydroxybenzene-6-sulfonic acid and 2-hydroxynaphthalene) with 15.4 parts of 5-nitro-2-amino-1-hydroxybenzene and 27 parts of the monoazo dye formed from diazotised 2-aminobenzoic acid and salicylaldehyde. The reaction mixture is heated to 90°–95° C.; the pH value is then adjusted to 7–7.5 with sodium hydroxide, and the mixture is held at this temperature and at constant pH value until the starting products are no longer detectable. After the reaction is completed, the dye is precipitated by the addition of sodium chloride, filtered off and dried. It is in the form of a dark powder which dissolves in water to give a brown colour, and which dyes leather in darkbrown shades having very good fastness to light.

When the procedure is carried out as described in the Examples 1–4 except that the 1:1 chrome complex of the respective azo dye given in column 2 of the following Table is used and is reacted with the azomethine dye shown opposite in column 3, or with the amines and aldehydes forming this dye, there is obtained in each case a 1:2 chrome complex which dyes leather in the shade of colour indicated in column 4.

TABLE

| No. | Azo dye | Azomethine dye | Shade |
|---|---|---|---|
| 1 | 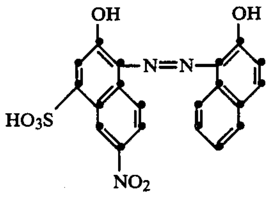 | 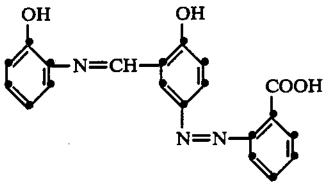 | brown |
| 2 | " | 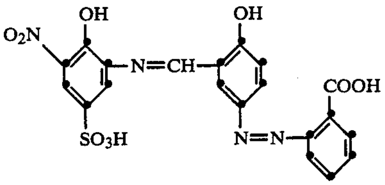 | dark brown |
| 3 | " | 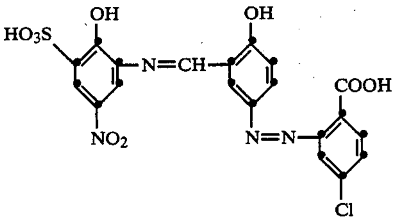 | yellowish-dark brown |
| 4 | " | 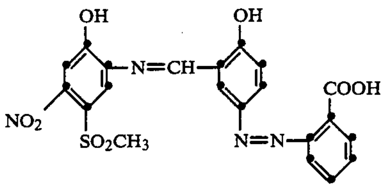 | dark brown |

TABLE-continued
| No. | Azo dye | Azomethine dye | Shade |
|---|---|---|---|
| 5 | " | 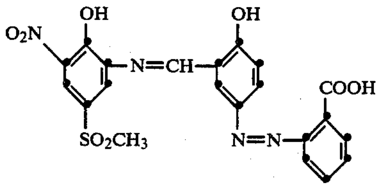 | " |
| 6 | " | 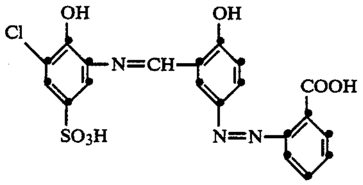 | " |
| 7 | " | 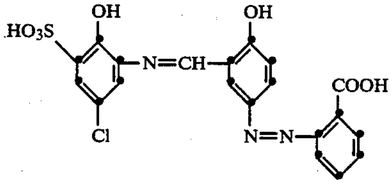 | " |
| 8 | " | 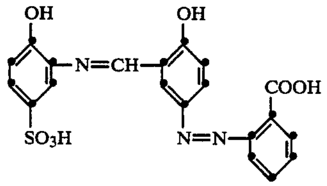 | " |
| 9 | " | 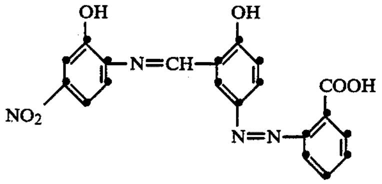 | brown |
| 10 | " | 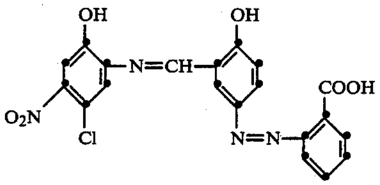 | " |
| 11 | " | 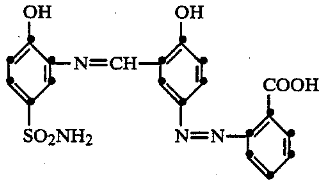 | " |
| 12 | " | 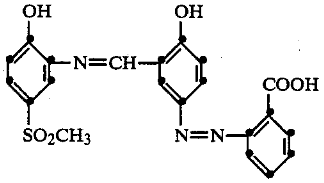 | " |

TABLE-continued
| No. | Azo dye | Azomethine dye | Shade |
|---|---|---|---|
| 13 | " | 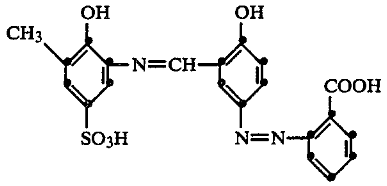 | " |
| 14 | " | 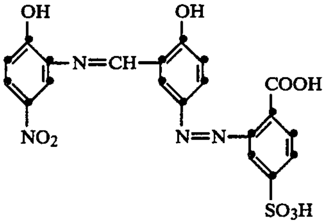 | reddish-brown |
| 15 | " | 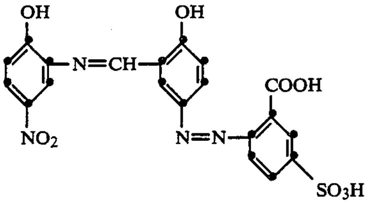 | " |
| 16 | " | 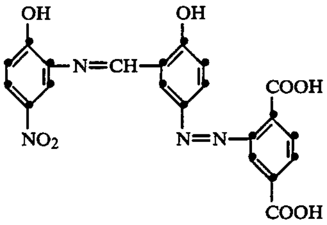 | " |
| 17 | 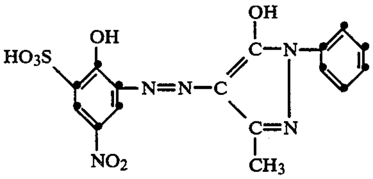 | 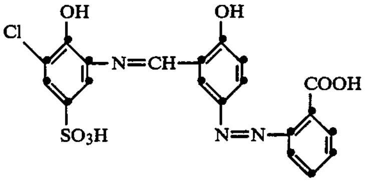 | orange |
| 18 | " | 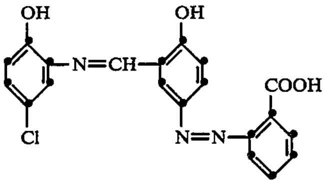 | " |
| 19 | 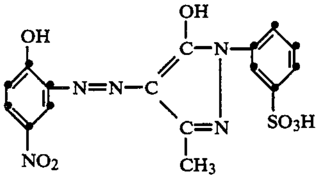 | 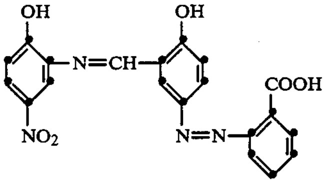 | " |

TABLE-continued
| No. | Azo dye | Azomethine dye | Shade |
|---|---|---|---|
| 20 | " | 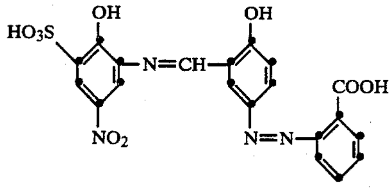 | " |
| 21 | 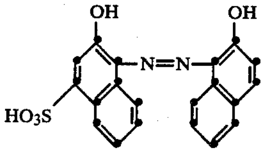 | " | olive |
| 22 | " | 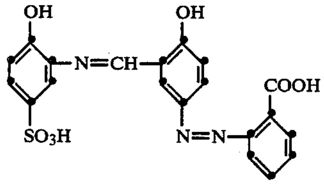 | olive-brown |
| 23 | " | 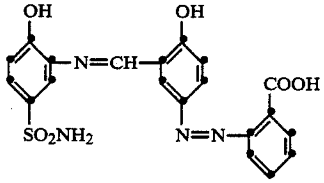 | " |
| 24 | " | 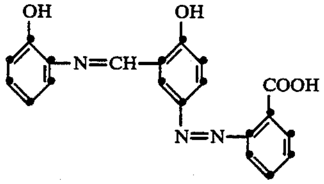 | " |
| 25 | " | 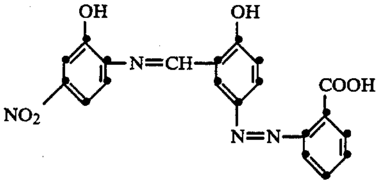 | brown |
| 26 | 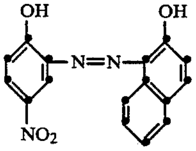 | 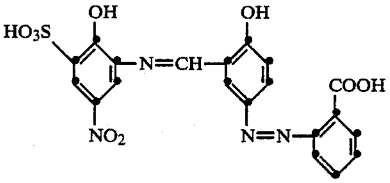 | " |
| 27 | " | 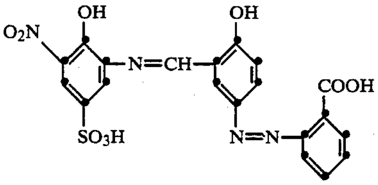 | " |

TABLE-continued
| No. | Azo dye | Azomethine dye | Shade |
|---|---|---|---|
| 28 | 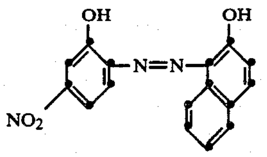 | 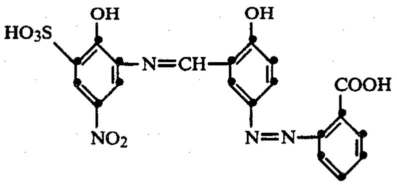 | olive |
| 29 | 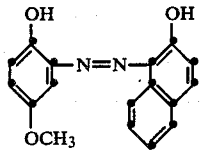 | " | brownish-olive |
| 30 | 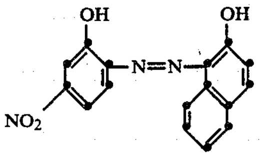 | 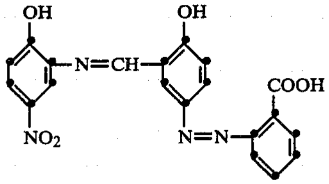 | olive |
| 31 | 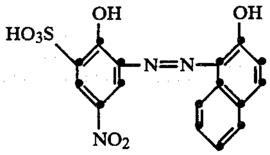 | 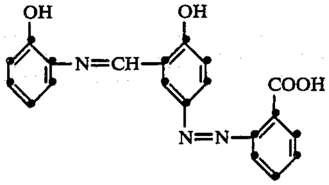 | brown |
| 32 | " | 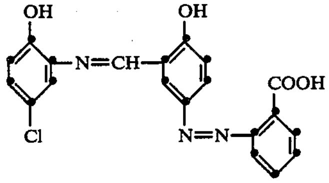 | " |
| 33 | " | 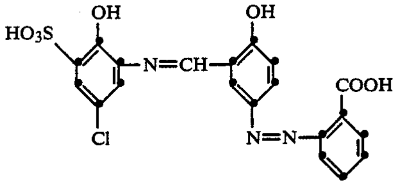 | " |
| 34 | " | 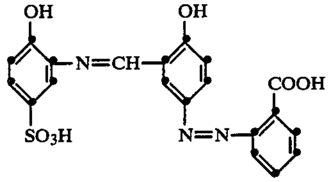 | " |
| 35 | 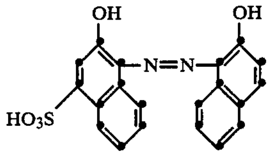 | 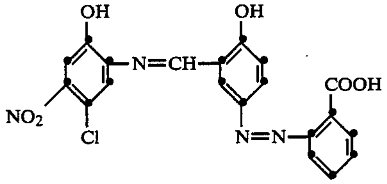 | dark brown |

TABLE-continued
| No. | Azo dye | Azomethine dye | Shade |
|---|---|---|---|
| 36 | 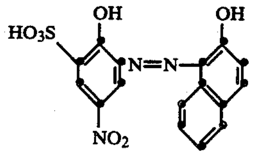 | 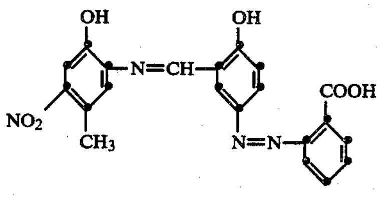 | ″ |
| 37 | ″ | 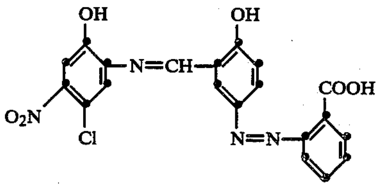 | ″ |
| 38 | ″ | 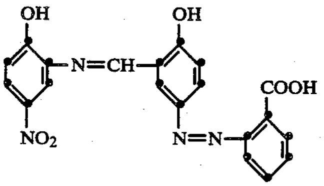 | brown |
| 39 | ″ | 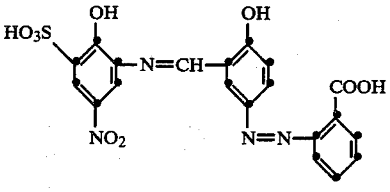 | ″ |
| 40 | 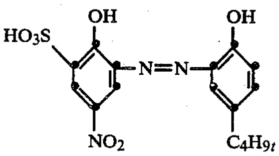 | ″ | ″ |
| 41 | 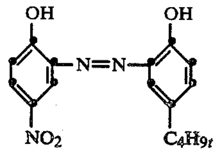 | ″ | ″ |
| 42 | 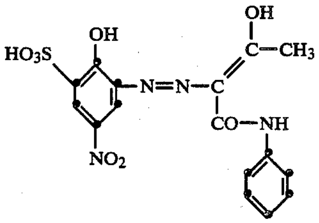 | 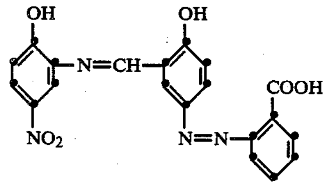 | brownish-yellow |
| 43 | 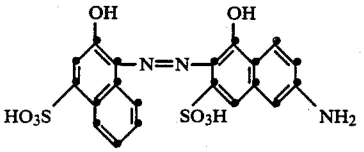 | ″ | brown-olive |

TABLE-continued
| No. | Azo dye | Azomethine dye | Shade |
|---|---|---|---|
| 44 | " | 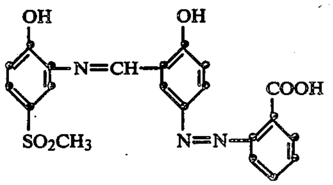 | olive |
| 45 | " | 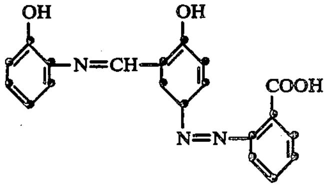 | brown-grey |
| 46 | " | 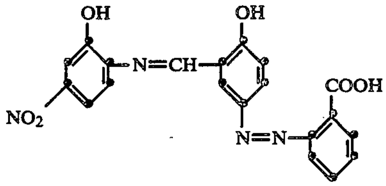 | " |
| 47 | 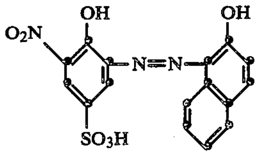 | " | dark brown |
| 48 | " | 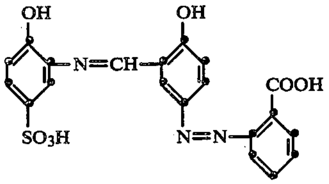 | brown |
| 49 | " | 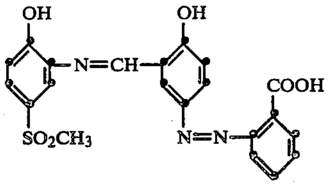 | " |
| 50 | " | 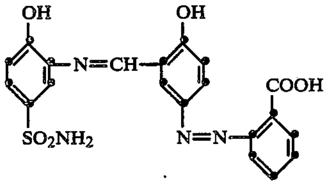 | " |
| 51 | 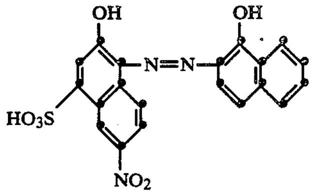 | 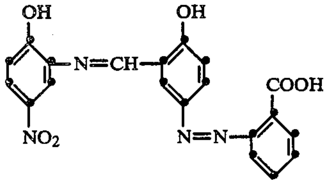 | dark brown |

TABLE-continued
| No. | Azo dye | Azomethine dye | Shade |
|---|---|---|---|
| 52 | " | 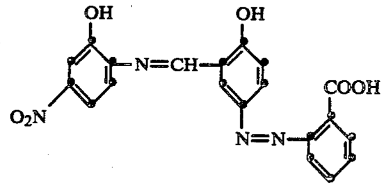 | " |
| 53 | " | 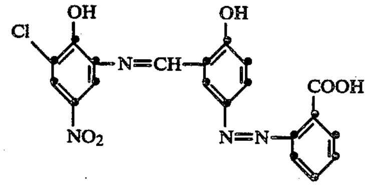 | " |
| 54 | " | 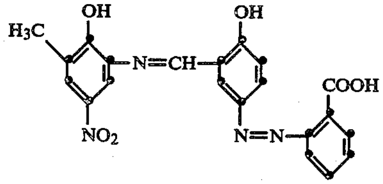 | " |
| 55 | 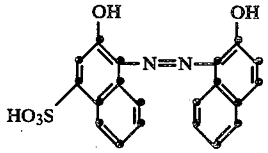 | 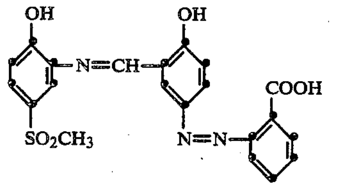 | olive-brown |
| 56 | 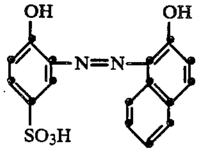 | 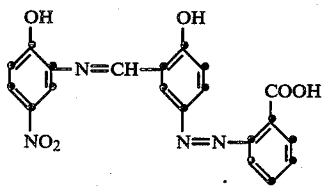 | brown |
| 57 | " | 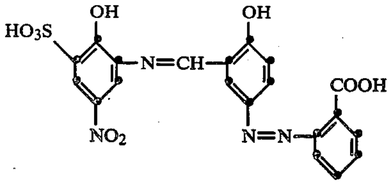 | yellowish brown |
| 58 | " | 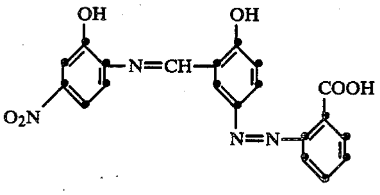 | brown |
| 59 | " | 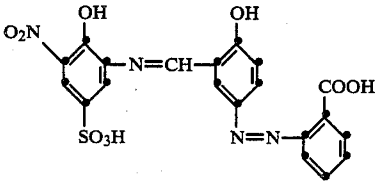 | " |

TABLE-continued
| No. | Azo dye | Azomethine dye | Shade |
|---|---|---|---|
| 60 | 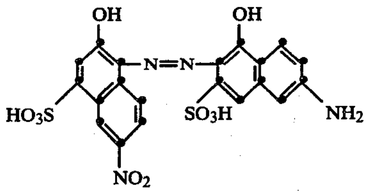 | 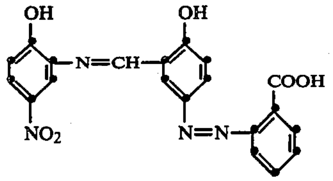 | olive |
| 61 | " | 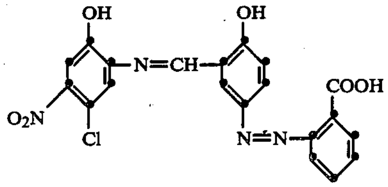 | greyish-brown |
| 62 | " | 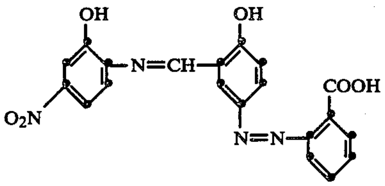 | " |
| 63 | " | 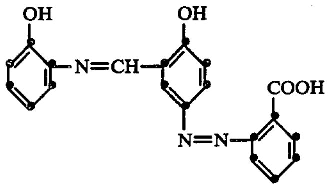 | greyish-olive |
| 64 | 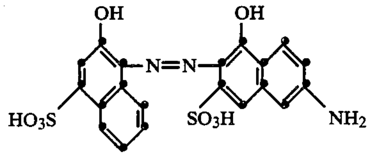 | 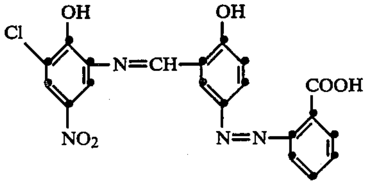 | brown-olive |
| 65 | " | 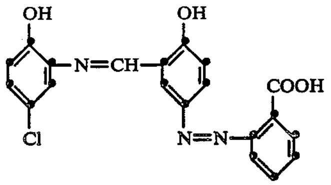 | olive |
| 66 | " | 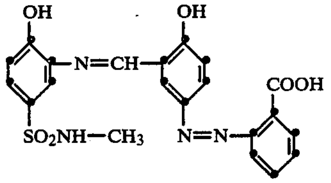 | " |
| 67 | 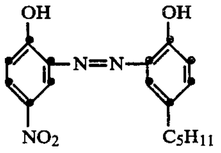 | 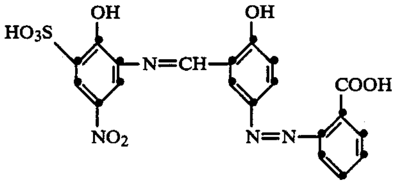 | brown |

TABLE-continued

| No. | Azo dye | Azomethine dye | Shade |
| --- | --- | --- | --- |
| 68 | 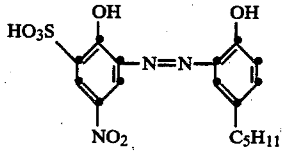 | 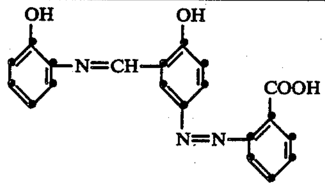 | yellowish-brown |
| 69 | 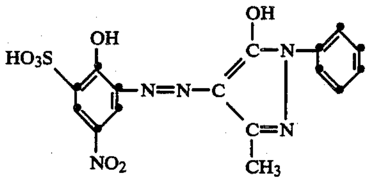 | 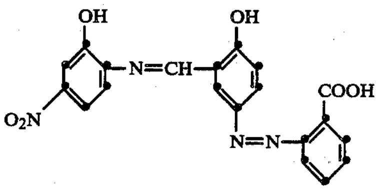 | brownish orange |
| 70 | 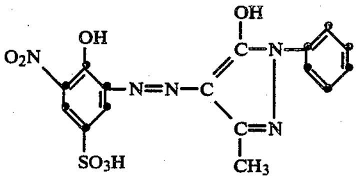 | " | " |
| 71 | 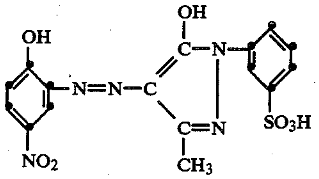 | " | " |

Dyeing Instructions for Leather 100 parts of suède leather for clothing (dry weight) are wetted back at 50° C. in a solution of 1000 parts by volume of water and 2 parts of 24% ammonia for 2 hours, and subsequently dyed at 60° C. in a solution of 1000 parts by volume of water, 2 parts of 24% ammonia and 6 parts of the dye from Example 4 for 1 hour. There is then added a solution of 40 parts by volume of water and 4 parts of 85% formic acid, and dyeing is performed for a further 30 minutes. The leather is subsequently well rinsed, and optionally further treated with 2 parts of a dicyandiamide/formaldehyde condensation product at 50° C. for 30 minutes.

Other suède leathers and also glove leathers can be treated in the same manner.

The dark-brown dyeings thus obtained are characterised by good fastness properties and a good covering capacity.

Dyeing Instructions for Polyamide 100 parts of polyamide knitting yarn are introduced at 50° C. into a dye bath containing, to 4000 parts of water, 2 parts of the dye of Example 4, 4 parts of ammonium sulfate and 2 parts of a levelling agent. The liquor is brought to boiling in the course of 45 minutes, and is held for a further 45 minutes at the boiling temperature. The dyed material is thereupon removed, thoroughly rinsed with cold water and dried. The result is a polyamide which has been dyed brown and which has good fastness properties.

Dyeing Instructions for Wool 100 parts of wool knitting yarn are introduced into a dye bath at 50° C., which contains, to 4000 parts of water, 2 parts of the dye of Example 4 in the Table, 4 parts of 80% acetic acid and 2 parts of a levelling agent. The dye liquor is brought to the boiling temperature in the course of 45 minutes and is held at boiling temperature for a further 45 minutes. The dyed material is thereupon removed, thoroughly rinsed with cold water and dried. A wool which is dyed in a brown shade and which has good fastness properties is obtained.

What is claimed is:

1. A 1:2 chrome complex dye of the formula

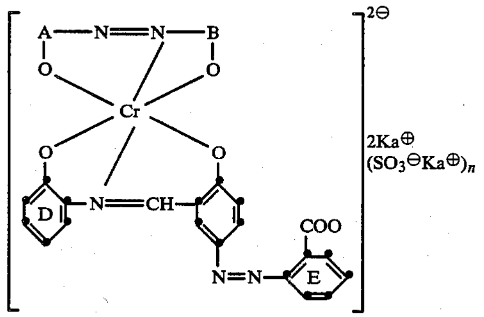

wherein

A is the radical of a diazo component of the benzene or naphthalene series, which carries the hydroxyl group in the o-position with respect to the azo group, B is the radical of a coupling component which carries the hydroxyl group in the position adjacent to the azo group, n is 1 or 2, and Ka⊕ is a cation, and wherein ring D is not further substituted or is momo- or disubstituted with a substituent selected from a group consisting of sulfo, nitro, halogen, $C_1$–$C_4$ alkyl, $C_1$–$C_4$ alkoxy, $C_1$–$C_4$ alkylsulfonyl, and sulfonamide;

ring E is not further substituted or is substituted by a substituent selected from the group consisting of chlorine, sulfo, methyl, and carboxyl; with the proviso that when B is a 2-naphthol radical, ring D is substituted only by a nitro group para to the nitrogen atom, and ring E has no substituent at positions 3–6 thereof, then A may not be 1-amino-2-hydroxynaphthelene-4-sulfonic acid.

2. A dye according to claim 1, wherein A is the radical of a 1-hydroxy-2-aminobenzene, which is unsubstituted or substituted by halogen, nitro, sulfo or low-molecular alkyl or alkoxy, or is the radical of a 1-amino-2-hydroxy-4-sulfonaphthalene, which is unsubstituted or substituted in the 6-position by halogen or by nitro or sulfo.

3. A dye according to claim 1, wherein B is a 1- or 2-naphthol which is unsubstituted or substituted by amino and/or sulfo, or is p-alkyl($C_1$–$C_6$)-phenol, 1-phenyl-3-methyl-5-pyrazolone or acetoacetic acid anilide, and the phenyl group in the two last-mentioned compounds can be substituted by $C_1$–$C_4$-alkyl, $C_1$–$C_4$-alkoxy, chlorine or sulfo.

4. A dye according to claim 1, wherein the ring D is unsubstituted or substituted by sulfo, nitro, halogen, methyl or methoxy.

5. A dye according to claim 1 of the formula

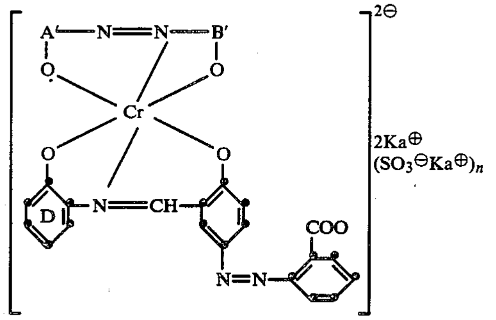

wherein

A' is the radical of a 1-hydroxy-2-aminobenzene, which is unsubstituted or substituted by halogen, nitro sulfo or low-molecular alkyl or alkoxy, or is the radical of a 1-amino-2-hydroxy-4-sulfonaphthalene, which is unsubstituted or substituted in the 6-position by chlorine, nitro or sulfo, B' is a 1- or 2-naphthol which is unsubstituted or substituted by amino and/or sulfo, or it is p-alkyl-($C_1$–$C_6$)-phenol, 1-phenyl-3-methyl-5-pyrazolone or acetoacetic acid anilide, and the phenyl group in the two last-mentioned compounds can be substituted by $C_1$–$C_4$-alkyl, $C_1$–$C_4$-alkoxy, chlorine or sulfo, n is 1 or 2, and wherein the ring D is unsubstituted or substituted by sulfo, nitro, halogen or methyl, and Ka⊕ is a cation, with the proviso that when B' is a 2-naphthol radical, and ring D is substituted only by a nitro group para to the oxygen atom, then A' cannot be a 1-amino-2-hydroxynaphthelene-4-sulfonic acid radical.

6. A dye according to claim 5, which contains in all 2 nitro groups.

7. A process for obtaining a dye of claim 1, which process comprises producing the 1:1 chrome complex of the azo dye, and subsequently reacting this with the arylazo-azomethine dye, or preferably with a mixture of the corresponding amine and aldehyde.

8. A process of dyeing a substrate of silk, wool, synthetic polyamide, synthetic polyurethane, leather or fur, comprising the step of applying to the substrate as 1:2 chrome complex dye of the formula

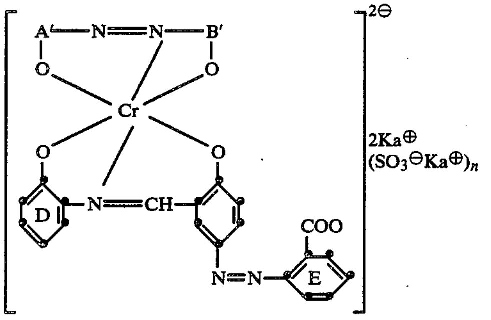

wherein

A is the radical of a diazo component of the benzene or naphthalene series, which carries the hydroxyl group in the o-position with respect to the azo group, B is the radical of a coupling component which carries the hydroxyl group in the position adjacent to the azo group, n is 1 or 2, and Ka⊕ is a cation, and wherein ring D is not further substituted or is momo- or disubstituted with a substituent selected from a group consisting of sulfo, nitro, halogen, $C_1$–$C_4$ alkyl, $C_1$–$C_4$ alkoxy, $C_1$–$C_4$ alkylsulfonyl, and sulfonamide;

ring E is not further substituted or is substituted by a substituent selected from the group consisting of chlorine, sulfo, methyl, and carboxyl; with the proviso that when B is a 2-naphthol radical, ring D is substituted only by a nitro group para to the nitrogen atom, and ring E has no substituent at positions 3–6 thereof, then A may not be 1-amino-2-hydroxynaphthelene-4-sulfonic acid.

9. A dye according to claim 2 wherein the 6-position halogen is bromine or chlorine.

* * * * *